3,459,812
PREPARATION OF HYDROQUINONE
Piero Pino, Pisa, Giuseppe Braca, S. Frediano a Settimo, and Glauco Sbrana, Pisa, Italy, assignors to Lonza Ltd., Gampel Valais, Switzerland
No Drawing. Filed Aug. 8, 1967, Ser. No. 659,022
Int. Cl. C07c 37/00, 39/08
U.S. Cl. 260—621                                    7 Claims

ABSTRACT OF THE DISCLOSURE

Hydroquinone is prepared by reacting acetylene and carbon monoxide in the presence of an organic solvent which contains 0.5 to 5 moles of water per 1 mole of acetylene and trimeric ruthenium tetracarbonyl as catalyst.

---

This invention relates to an improved method for the catalytic preparation of hydroquinone from acetylene an carbon monoxide.

Hydroquinone has been obtained by reacting acetylene with carbon monoxide in contact with a component containing a hydroxyl group and with a catalytic amount of a halide, carbonyl, or chelate compound of ruthenium or rhodium. When ruthenium compounds are employed, the yields of hydroquinone, calculated on acetylene, are below 20 percent, even though very high pressures such as 700 to 1500 atmospheres and high catalyst concentrations are used. Said yields may be increased by employing the very expensive rhodium chloride, but even then reach 54% only when catalyst mixtures of rhodium chloride and triphenyl phosphine are used. When rhodium halides are used, there are the additional drawbacks of corrosion due to the presence of halides (see DAS 1,135,486). A still further drawback are the long reaction times of 14 to 17 hours.

In British Patent No. 1,031,877 and in our copending application Ser. No. 398,478, filed Aug. 13, 1964, now U.S. Patent No. 3,355,503 issued Nov. 28, 1967, process has been disclosed in which hydroquinone is prepared from acetylene, carbon monoxide, and hydrogen at temperatures of 100 to 300° C. and at pressures of 50 to 350 atmospheres in an organic solvent which does not contain mobile hydrogen atoms, in contact with trimeric ruthenium carbonyl. In said process, yields up to 30 percent are obtained within 1½ to 7 hours.

It is a principal object of this invention to provide a technically simple method for obtaining hydroquinone in higher yields.

This and other objects of the invention are accomplished by reacting acetylene, carbon monoxide, and water in a molar ratio of water to acetylene of 0.5 to 5 in the presence of trimeric ruthenium tetracarbonyl at temperatures of 200 to 280° C. and at pressures of 50 to 450 atmospheres in an organic solvent; when the reaction is terminated, the organic solvent is distilled off and the hydroquinone is recovered from the distillation residue, e.g., by extraction with water.

Surprisingly, it was found that at temperatures of 200 to 280° C. and a molar ratio of water to acetylene of 0.5 to 5, preferably 0.8 to 2.5, in the presence of trimeric ruthenium tetracarbonyl as catalyst the yields of hydroquinone rise to 60 percent and more; thereby, the reaction times are far below those required in the prior art methods.

Suitable solvents are those in which acetylene, carbon monoxide, trimeric ruthenium tetracarbonyl [Ru(CO)$_4$]$_3$, and water are soluble at reaction temperature. Such solvents are, e.g., aromatic hydrocarbons such as toluene; ketones such as acetone, methylisobutyl ketone; ethers such as dioxane, tetrahydrofurane, diisopropyl ether; oxyethers such as 2-methoxy ethanol, 2-ethoxy ethanol; and esters, such as ethyl acetate.

After termination of the reaction, the organic solvent and any low boiling reaction products are removed by distillation. The hydroquinone may be extracted with water from the high boiling distillation residue which latter is substantially insoluble in water and contains the ruthenium introduced by the catalyst.

In investigating the recovery of said ruthenium, it was observed that, surprisingly, the ruthenium present in the residue is still catalytically active. Therefore, said residue can be used directly as such as catalyst for activating the reaction of the reactants whereby the yield is of the same order of magnitude as with the pure [Ru(CO)$_4$]$_3$.

Of course, it is also easily possible to recover the ruthenium of the extraction residue in the form of RuCl$_3$, RuO$_4$″, RuO$_4$ or RuO$_2$ by treating the residue with hydrochloric acid, sodium hydroxide, sodium nitrate, sulfuric acid, sodium bromate, or by combustion in air. The thus obtained ruthenium compounds may be reconverted to [Ru(CO)$_4$]$_3$ by the process disclosed in German Patent No. 1,216,276.

The trimeric ruthenium tetracarbonyl can also be formed in situ during the reaction from compounds which, under the reaction conditions, can be converted to the carbonyl, such as ruthenium acetylacetonate, basic ruthenium acetate or succinate, or sodium hexachlororuthenate.

The concentration of the catalyst is not critical preferably, amounts of 0.2 to 1.0 g. per liter of reaction mixture are used.

The partial pressure of the CO does not affect the reaction. Generally, a partial pressure of 50 to 450 atmospheres is applied.

Though the amount of solvent is not critical for the operation, it has been found to be of advnatage to use a molar ratio of solvent to introduced acetylene of 2 to 15.

The following examples are given to illustrate and not to limit the invention.

Example 1

Into a shaking autoclave of acid-resistant material having a capacity of 485 cm.$^3$, there was placed a ball of acid-resistant steel and a small glass tube the capillary point of which remained outside the solvent and which containing 0.15 g. of trimeric ruthenium tetracarbonyl [Ru(CO)$_4$]$_3$. The autoclave was cooled and evacuated and then charged with 151 g. of tetrahydrofurane, 8 g. of water, and 0.249 mole of acetylene. Subsequently, carbon monoxide was pressured into the autoclave of a pressure of 122 atmospheres, and the autoclave was heated with shaking at 250° C. The total pressure was then 310 atmospheres. The autoclave was then turned upside down so as to break the glass tube containing the catalyst.

The reaction started at once as indicated by the decreasing pressure. After 45 minutes, when the pressure had become constant; the autoclave was quickly cooled, and the pressure was released. The escaping gases were analyzed, and no acetylene could be found.

The liquid reaction mixture was removed from the autoclave and distilled at normal pressure. The distillation residue (15.7 g.) was extracted for 15 hours with hot water having a temperature of at least 90° C. in a Kumagawa extraction apparatus. Subsequently, the water was removed at reduced pressure (20 mm. Hg), and the obtained crude hydroquinone was sublimed at a pressure of 1.5 to 2 mm. Hg. There were obtained 8.2 g. of hydroquinone, corresponding to a yield of 59.8 percent; melting point 170–172° C.

Examples 2-7

These examples were carried out similarly to Example 1. The reaction conditions and results are given in Table I.

the reaction mixture, and then CO was introduced at a pressure of 177 atmospheres. The reaction temperature was 240° C., the reaction pressure was 426 atmospheres, and the reaction time was 33 minutes.

TABLE I

| Ex. | [Ru(CO₄)]₃ | Solvent Type | C₂H₂ G. | C₂H₂ Introduced moles | C₂H₂ Reacted moles | H₂O, g. | Moles H₂O/ moles C₂H₂ | Pressure at reaction temperature | Temperature °C. | Reaction time, min. | Yield of hydroquinone calc. on reacted C₂H₂, percent |
|---|---|---|---|---|---|---|---|---|---|---|---|
| 2 | 0.15 | Tetrahydrofurane | 151 | 0.249 | 0.249 | 8.0 | 1.79 | 310 | 250-255 | 35 | 59.8 |
| 3 | 0.08 | do | 266 | 0.216 | 0.216 | 8.10 | 2.09 | 400 | 260-270 | 30 | 52.0 |
| 4 | 0.20 | Methylisobutylketone | 240 | 0.257 | 0.255 | 9.0 | 1.96 | 390 | 250-260 | 20 | 56.5 |
| 5 | 0.15 | Diisopropylether | 218 | 0.216 | 0.216 | 8.0 | 2.06 | 410 | 250-260 | 35 | 48.2 |
| 6 | 0.15 | 2-ethoxyethanol | 279 | 0.212 | 0.212 | 8.0 | 2.10 | 365 | 260 | 19 | 55.0 |
| 7 | 0.15 | 2-methylisobutylketone | 240 | 0.218 | 0.218 | 8.0 | 2.04 | 392 | 280-290 | 10 | 37.1 |

Example 8

0.3 g. of [Ru(CO₄)]₃, enclosed in a glass tube, were introduced, as in Example 1, into a shaking autoclave of 485 cm.³ capacity.

The autoclave was cooled and evacuated and then charged with 222 g. of tetrahydrofurane, 10.4 g. of water, and 0.301 mole of acetylene. Subsequently, carbon monoxide was injected until the pressure in the autoclave was 150 atmospheres. The autoclave was then heated at 220° C. whereby the pressure rose to 260 atmospheres. The autoclave was turned upside down whereby the glass tube containing the catalyst was broken. The reaction started at once; after 55 minutes, when the pressure had stopped falling, the autoclave was quickly cooled with cold water. The escaping gases were free of acetylene.

After opening of the pressure-released autoclave, the reaction mixture was not processed, but the autoclave was recharged with acetylene, carbon monoxide, and water. This operation was repeated six times. The reaction conditions of the individual runs are given in Table II.

TABLE II

| Run | C₂H₂ Introduced moles | C₂H₂ Recovered moles | Water, g. | CO pressure at 25°C. atm. | Total pressure at reaction pressure atm. | Reaction time, min. | Temperature, °C. |
|---|---|---|---|---|---|---|---|
| 2 | 0.292 | 0 | 6 | 130 | 268 | 55 | 220 |
| 3 | 0.298 | 0 | 6.2 | 180 | 309 | 63 | 220 |
| 4 | 0.320 | 0 | 7.2 | 170 | 329 | 62 | 220 |
| 5 | 0.285 | 0 | 7.0 | 153 | 280 | 51 | 220 |
| 6 | 0.313 | 0 | 7.0 | 180 | 362 | 60 | 220 |
| 7 | 0.313 | 0 | 5.0 | 165 | 438 | 63 | 215 |

Subsequently, the pressure in the autoclave was released, the reaction mixture was removed, and the tetrahydrofurane was distilled off at normal pressure. Subsequently, the residue of 115.7 g. was extracted with hot water for 24 hours in a Kumagawa extraction apparatus.

The water was distilled off at 20 mm. Hg., and the crude hydroquinone was sublimed at 1.5–2 mm. Hg. There were obtained 69.1 g. of hydroquinoe (m. 170–172° C.), corresponding to a yield of 59.4 g., calculated on acetylene.

Example 9

Part (15.3 g.) of the water insoluble residue of Example 8 which remained from the water extraction and contained the catalyst, was dissolved in 215 g. of tetrahydrofurane and recharged into the autoclave. After the air had been evacuated, 12 g. of water and 0.352 mole of acetylene were charged into the cooled autoclave. Then carbon monoxide was pressured into the autoclave at 154 atmospheres. With shaking, the autoclave was heated at 230° C. whereby the pressure reached 298 atmospheres. After 61 minutes, the reaction was terminated, the autoclave was quickly cooled, and the pressure released. No acetylene was found in the escaping gases.

Subsequently, once again 8 g. of water and 0.41 mole of acetylene were charged into the autoclave containing The hydroquinone was recovered as described in Example 8. There were obtained 27.3 g., corresponding to a yield of 65.2 percent.

What is claimed is:

1. A process for preparing hydroquinone which comprises reacting acetylene and carbon monoxide at a temperature of 200 to 280° C. and at a starting pressure of 50 to 450 atmospheres in the presence of trimeric ruthenium tetracarbonyl as catalyst in a liquid reaction medium which consists essentially of an organic solvent and water, said water being present in an amount of 0.5 to 5 moles for 1 mole of acetylene, distilling off said solvent after the reaction is completed, and recovering the formed hydroquinone from the distillation residue, said organic solvent being selected from the group consisting of toluene, acetone, methylisobutyl ketone, dioxane, tetrahydrofurane, diisopropyl ether, 2-methoxy ethanol, 2-ethoxy ethanol, and ethyl acetate.

2. The process as claimed in claim 1 wherein said water is present in an amount of 0.8 to 2.5 moles per 1 mole of acetylene.

3. The process as claimed in claim 1 wherein said temperature is in the range of 220 to 260° C.

4. The process as claimed in claim 1 wherein said catalyst is present in an amount of 0.2 to 1.0 g. per liter of reaction medium.

5. The process as claimed in claim 1 comprising forming said trimeric ruthenium tetracarbonyl under the reaction conditions in situ.

6. The process as claimed in claimed 1 wherein the hydroquinone is recovered by extracting said distillation residue with water.

7. The process as claimed in claim 1 comprising using the composition remaining after recovery of the hydroquinone as said catalyst.

References Cited

UNITED STATES PATENTS 3,055,949  9/1962  Howk et al. _____ 260—621

FOREIGN PATENTS 1,232,974  1/1967  Germany.

BERNARD HELFIN, Primary Examiner

N. P. MORGENSTERN, Assistant Examiner